United States Patent
Xia et al.

(10) Patent No.: US 11,943,017 B2
(45) Date of Patent: Mar. 26, 2024

(54) PRECODING METHOD AND APPARATUS, AND INFORMATION TRANSMISSION METHOD AND APPARATUS

(71) Applicant: Huawei Technologies Co., Ltd., Shenzhen (CN)

(72) Inventors: Xin Xia, Chengdu (CN); Zhenbing Zhang, Chengdu (CN); Yun Liu, Chengdu (CN); Lu Guan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 366 days.

(21) Appl. No.: 17/357,392

(22) Filed: Jun. 24, 2021

(65) Prior Publication Data
US 2021/0328632 A1    Oct. 21, 2021

Related U.S. Application Data
(63) Continuation of application No. PCT/CN2019/128474, filed on Dec. 25, 2019.

(30) Foreign Application Priority Data
Dec. 26, 2018 (CN) .......................... 201811603975.8

(51) Int. Cl.
*H04W 4/00* (2018.01)
*H04B 7/0456* (2017.01)
(Continued)

(52) U.S. Cl.
CPC ............ *H04B 7/0456* (2013.01); *H04W 8/24* (2013.01); *H04W 72/20* (2023.01)

(58) Field of Classification Search
CPC .. H04B 7/0456; H04B 7/0413; H04B 7/0426; H04W 8/24; H04W 72/20; H04L 5/0053
See application file for complete search history.

(56) References Cited

U.S. PATENT DOCUMENTS
6,628,844 B1 * 9/2003 Benitz ................. G01S 13/9011
                                                            382/280
6,985,534 B1 * 1/2006 Meister ................. H04L 5/0007
                                                            375/260
(Continued)

FOREIGN PATENT DOCUMENTS
CN          101114863 A         1/2008
CN          101848174 A         9/2010
(Continued)

OTHER PUBLICATIONS
Jiang, Y. et al., "Joint Transceiver Design for MIMO Communications Using Geometric Mean Decomposition", IEEE Transactions on Signal Processing, vol. 53, No. 10, Oct. 2005, 13 pages.
(Continued)

*Primary Examiner* — Stephen M D Agosta
(74) *Attorney, Agent, or Firm* — Slater Matsil, LLP (57) ABSTRACT

This application discloses a precoding method and apparatus, and an information transmission method and apparatus, and relates to the field of communications technologies, to help improve overall performance of a plurality of data streams corresponding to a same codeword. The precoding method includes: decomposing a channel matrix into a product of a matrix Q, a matrix R, and a matrix PH, where the matrix PH is a conjugate transpose matrix of a matrix P, both the matrix Q and the matrix P are unitary matrices, and the matrix R is an upper triangular matrix; and precoding to-be-sent data based on the matrix P.

20 Claims, 5 Drawing Sheets

(51) Int. Cl.
  *H04W 8/24* (2009.01)
  *H04W 72/20* (2023.01)

(56) References Cited

U.S. PATENT DOCUMENTS

| | | | |
|---|---|---|---|
| 8,121,220 B1* | 2/2012 | Shi | H04L 25/03292 375/316 |
| 8,229,017 B1* | 7/2012 | Lee | H04B 7/0665 375/267 |
| 9,544,423 B2* | 1/2017 | Wei | H04B 3/32 |
| 9,800,720 B2* | 10/2017 | Lu | H04M 3/18 |
| 9,887,736 B2* | 2/2018 | Maes | H04L 5/143 |
| 9,985,686 B2* | 5/2018 | Maes | H04L 25/03343 |
| 2005/0185734 A1* | 8/2005 | Hottinen | H04B 7/0669 375/295 |
| 2006/0050655 A1* | 3/2006 | Shi | H04L 1/0618 370/254 |
| 2006/0056338 A1* | 3/2006 | Abe | H04B 7/0842 370/328 |
| 2006/0068718 A1* | 3/2006 | Li | H04B 7/0417 455/562.1 |
| 2006/0251061 A1* | 11/2006 | Kim | H04Q 11/00 370/366 |
| 2006/0274825 A1* | 12/2006 | Cioffi | H04L 25/03343 375/295 |
| 2008/0018535 A1* | 1/2008 | Hwang | H01Q 1/52 342/368 |
| 2008/0112504 A1 | 5/2008 | Jiang et al. | |
| 2009/0060067 A1* | 3/2009 | Guenach | H04B 3/32 375/285 |
| 2009/0147666 A1* | 6/2009 | Fang | H04L 25/022 379/406.06 |
| 2010/0086067 A1* | 4/2010 | Oka | H04B 7/0854 375/260 |
| 2010/0261482 A1* | 10/2010 | Guey | H04B 7/024 455/452.2 |
| 2011/0122819 A1* | 5/2011 | Jongren | H04L 1/1887 370/328 |
| 2011/0286502 A1 | 11/2011 | Adachi et al. | |
| 2011/0292983 A1* | 12/2011 | Ito | H04L 25/0204 375/224 |
| 2012/0164951 A1* | 6/2012 | Wang | H04B 7/0617 455/63.4 |
| 2012/0170675 A1* | 7/2012 | Li | H04B 7/0452 375/267 |
| 2013/0308729 A1* | 11/2013 | Vainsencher | H04L 25/067 375/340 |
| 2014/0146904 A1* | 5/2014 | Onodera | H04L 25/03942 375/267 |
| 2014/0204841 A1* | 7/2014 | Ruiz Delgado | H04B 7/0452 370/328 |
| 2014/0233682 A1* | 8/2014 | Hasegawa | H04B 7/04 375/340 |
| 2016/0043786 A1* | 2/2016 | Maes | H04B 3/32 375/260 |
| 2016/0072560 A1* | 3/2016 | Fukawa | H04B 7/0842 375/267 |
| 2016/0295014 A1* | 10/2016 | Wei | H04M 3/34 |
| 2017/0054473 A1* | 2/2017 | Jochen | H04B 7/0465 |
| 2017/0141823 A1* | 5/2017 | Fodor | H04B 7/0404 |
| 2017/0180020 A1 | 6/2017 | Namgoong et al. | |
| 2017/0279490 A1* | 9/2017 | Maes | H04L 25/03821 |
| 2017/0279547 A1* | 9/2017 | Hu | H04B 17/327 |
| 2018/0115349 A1 | 4/2018 | Crasmariu et al. | |
| 2018/0115350 A1 | 4/2018 | Enescu et al. | |
| 2018/0183503 A1* | 6/2018 | Rahman | H04B 7/0486 |
| 2019/0372631 A1* | 12/2019 | Taira | H04B 1/7103 |

FOREIGN PATENT DOCUMENTS

| | | |
|---|---|---|
| CN | 101986575 A | 3/2011 |
| CN | 102025405 A | 4/2011 |
| CN | 102447537 A | 5/2012 |
| CN | 102546088 A | 7/2012 |
| CN | 103220033 A | 7/2013 |
| CN | 103647620 A | 3/2014 |
| CN | 105162504 A | 12/2015 |
| CN | 105703813 A | 6/2016 |
| CN | 107332596 A | 11/2017 |
| CN | 108599821 A | 9/2018 |
| CN | 109039400 A | 12/2018 |

OTHER PUBLICATIONS

Jiang Y. et al., "The Generalized Triangular Decomposition", Internet Citation, XP-002369229, Apr. 29, 2004, 22 pages.
Jiang Y. et al., "Transceiver Design using Generalized Triangular Decomposition for MIMO Communications with QoS Constraints", Nov. 7, 2004, 4 pages.

* cited by examiner

PRECODING METHOD AND APPARATUS, AND INFORMATION TRANSMISSION METHOD AND APPARATUS

CROSS-REFERENCE TO RELATED APPLICATIONS

This application is a continuation of International Application No. PCT/CN2019/128474, filed on Dec. 25, 2019, which claims priority to Chinese Patent Application No. 201811603975.8, filed on Dec. 26, 2018. The disclosures of the aforementioned applications are hereby incorporated by reference in their entireties.

TECHNICAL FIELD

This application relates to the field of communications technologies, and in particular, to a precoding method and apparatus, and an information transmission method and apparatus.

BACKGROUND

A multiple-input multiple-output (MIMO) system usually improves a channel by using a precoding technology, to improve a spatial multiplexing effect. In the precoding technology, a precoding matrix matching the channel is used to process a spatially multiplexed data stream, to implement channel precoding and improve receiving quality of the data stream.

Currently, the precoding matrix is usually obtained through singular value decomposition (SVD) on a channel matrix. However, as stipulated in an existing communications standard such as 3GPP 5G NR, for a terminal, when a quantity of spatially multiplexed data streams is less than or equal to four, one codeword is used, that is, a same modulation and coding scheme (MCS) is used. Therefore, an equivalent channel gain of each data stream is directly proportional to a singular value obtained through SVD on the channel matrix, which may lead to a relatively large performance difference between different data streams. For example, four data streams are spatially multiplexed. Generally, performance of the third data stream and the fourth data stream is relatively poor, which slows down overall performance of data streams corresponding to a codeword.

SUMMARY

Embodiments of this application provide a precoding method and apparatus, and an information transmission method and apparatus, to help improve overall performance of a plurality of data streams corresponding to a same codeword.

According to a first aspect, an embodiment of this application provides a precoding method, including: decomposing a channel matrix into a product of a matrix Q, a matrix R, and a matrix $P^H$, where the matrix $P^H$ is a conjugate transpose matrix of a matrix P, both the matrix Q and the matrix P are unitary matrices, and the matrix R is an upper triangular matrix; and precoding to-be-sent data based on the matrix P. The at least two diagonal elements may be a plurality of any diagonal elements in the matrix R. The method may be performed by a transmit end device (for example, a network device or a terminal). Precoding based on the technical solution helps meet a ratio between equivalent channel gains of a plurality of spatially multiplexed data streams (which may be specifically represented as diagonal elements of the matrix R), and rational setting of the ratio helps improve overall performance of data streams corresponding to a codeword. For example, four data streams are spatially multiplexed. Equivalent channel gains of the plurality of spatially multiplexed data streams may be set, so that performance differences between the four data streams are small, thereby improving overall performance.

In a possible design, a ratio of at least two diagonal elements of the matrix R is a target ratio, and the target ratio is determined based on a code rate. A larger code rate indicates that the target ratio is closer to 1:1-1. This helps improve overall performance of a plurality of data streams corresponding to a same codeword.

In a possible design, if a ratio of diagonal elements of the matrix R is $r_{1,1}:r_{2,2}: \ldots :r_{k,k}: \ldots :r_{t,t}=A_1:A_2: \ldots :A_k: \ldots :A_t$, where $r_{k,k}$ is a $k^{th}$ diagonal element of the matrix R, $1 \leq k \leq t \leq K$, both k and t are integers, and K is a quantity of diagonal elements of the matrix R, $r_{k,k}=A_k\theta$, where $\theta$ is determined based on a non-zero singular value obtained through SVD on the channel matrix. To be specific, the "at least two diagonal elements of the matrix R" are specifically first to $t^{th}$ elements in the matrix R. The target ratio is specifically $A_1:A_2: \ldots :A_k: \ldots :A_t$.

In a possible design, $$\theta = \left(\frac{1}{\prod_{j=1}^t A_j}\right)^{1/t} \left(\prod_{j=1}^t \lambda_j\right)^{1/t},$$

where $\lambda_j$ is a $j^{th}$ non-zero singular value obtained through SVD on the channel matrix, and j=1, 2, ..., t. $\Pi$ represents a product operation, and $\Pi_{j=1}^t A_j$ represents a product operation on $A_1, A_2, \ldots,$ and $A_t$.

In a possible design, $t \geq 2$, and a non-zero singular value obtained through SVD on the channel matrix and a diagonal element in a diagonal matrix obtained through SVD on the channel matrix meet the following condition:

$$\begin{cases} \lambda_1 > \sigma_1 \\ \lambda_2 < \sigma_2 < \frac{\lambda_1 \lambda_2}{\sigma_1} \\ \vdots \\ \lambda_{t-1} < \sigma_{t-1} < \frac{\lambda_1 \lambda_2 \cdots \lambda_{t-1}}{\sigma_1 \sigma_2 \cdots \sigma_{t-1}}, \end{cases}$$

where $\lambda_k$ is a $k^{th}$ non-zero singular value obtained through SVD on the channel matrix, $\sigma_k$ is $A_k\theta$, and $1 \leq k \leq t \leq K$. This possible design provides a specific implementation of the condition met by the target ratio. Certainly, this embodiment of this application is not limited thereto.

In a possible design, the decomposing a channel matrix into a product of a matrix Q, a matrix R, and a matrix $P^H$ includes: performing SVD on the channel matrix, to decompose the channel matrix into a product of a matrix U, a matrix $\Sigma$, and a matrix $V^H$, where the matrix $V^H$ is a conjugate transpose matrix of a matrix V, both the matrix U and the matrix V are unitary matrices, and the matrix $\Sigma$ is a diagonal matrix; and transforming the matrix U, the matrix $\Sigma$, and the matrix $V^H$ to obtain the matrix Q, the matrix R, and the matrix $P^H$.

In a possible design, the target ratio is a ratio of the first to $t^{th}$ diagonal elements in the matrix R, where $1 \leq k \leq t \leq K$, both k and t are integers, and K is a quantity of diagonal elements of the matrix R. Based on this, the transforming the matrix U, the matrix Σ, and the matrix $V^H$ to obtain the matrix Q, the matrix R, and the matrix $P^H$ includes:

using the matrix Σ as an initial matrix $R_0$ of the matrix R; traversing each value of k=1, 2, ..., t−1, where 1≤k≤t≤K, both k and t are integers, and K is the quantity of diagonal elements of the matrix R; and performing the following steps 1 to 4:

step 1: finding a diagonal element $r_{p,p}$ from a matrix $R_{k-1}$ based on a magnitude relationship between $\sigma_k$ and a $k^{th}$ diagonal element $r_{k,k}$ in the matrix $R_{k-1}$, where k<p≤K, p is an integer, and $\sigma_k$ is $A_k\theta$; if $r_{k,k} \geq \sigma_k$, $r_{p,p} \leq \sigma_k$; and if $r_{k,k} < \sigma_k$, $r_{p,p} > \sigma_k$;

step 2: switching diagonal elements $r_{k+1,k+1}$ and $r_{p,p}$ in the matrix $R_{k-1}$, to obtain a matrix $R_{re\_k}$;

step 3: constructing a matrix $G_1$ and a matrix $G_2$ based on $\sigma_k$ and a $k^{th}$ diagonal element and a $(k+1)^{th}$ diagonal element in the matrix $F_{re\_k}$, where the matrix $G_1$ and the matrix $G_2$ make a submatrix formed by an intersection of $k^{th}$ and $(k+1)^{th}$ rows and $k^{th}$ and $(k+1)^{th}$ columns in $G_2^T R_{re\_k} G_1$ be an upper triangular matrix, a first diagonal element of the submatrix is $\sigma_k$, and $G_2^T$ is a transpose matrix of the matrix $G_2$; and step 4: obtaining a matrix $R_k$ based on a formula $R_k = G_2^T R_{re\_k} G_1$; and using, as the matrix R, a matrix $R_{t-1}$ obtained after steps 1 to 4 are performed at a $(t-1)^{th}$ time.

In a possible design, the constructing a matrix $G_1$ and a matrix $G_2$ based on $\sigma_k$ and a $k^{th}$ diagonal element and a $(k+1)^{th}$ diagonal element in the matrix $R_{re\_k}$ includes: constructing the matrix $G_1$ and the matrix $G_2$ based on the following formula:

$$G_1 = \frac{1}{\sigma_k}\begin{bmatrix} c\delta_1 & s\delta_2 \\ -s\delta_2 & c\delta_1 \end{bmatrix} \text{ and }$$

$$G_2 = \begin{bmatrix} c & s \\ -s & c \end{bmatrix},$$

where $$c = \sqrt{\frac{\sigma_k^2 - \delta_2^2}{\delta_1^2 - \delta_2^2}}, s = \sqrt{1-c^2}, \delta_1$$

is the $k^{th}$ diagonal element in the matrix $R_{re\_k}$, and $\delta_2$ is the $(k+1)^{th}$ diagonal element in the matrix $R_{re\_k}$. This possible design provides a specific implementation of constructing the matrix $G_1$ and the matrix $G_2$.

In a possible design, the transforming the matrix U, the matrix Σ, and the matrix $V^H$ to obtain the matrix Q, the matrix R, and the matrix $P^H$ further includes: using the matrix U as an initial matrix $Q_0$ of the matrix Q and using the matrix V as an initial matrix $P_0$ of the matrix P; and in a process of performing steps 1 to 4 at a $k^{th}$ time: switching a $(k+1)^{th}$ column of elements and a $p^{th}$ column of elements in a matrix $Q_{k-1}$ to obtain a matrix $Q_{re\_k}$, and switching a $(k+1)^{th}$ column of elements and a $p^{th}$ column of elements in a matrix $P_{k-1}$ to obtain a matrix $P_{re\_k}$; obtaining a matrix $Q_k$ based on a formula $Q_k = Q_{re\_k} G_2$, and obtaining a matrix k based on a formula $P_k = P_{re\_k} G_1$; and using, as the matrix Q, a matrix $Q_{t-1}$ obtained after steps 1 to 4 are performed at the $(t-1)^{th}$ time, and using, as the matrix P, a matrix $P_{t-1}$ obtained after steps 1 to 4 are performed at the $(t-1)^{th}$ time.

According to a second aspect, an embodiment of this application provides an information transmission method, including: receiving, by a transmit end device, receiving capability information from a receive end device, where the receiving capability information is used to indicate that the receive end device supports a non-linear receiving algorithm; precoding, by the transmit end device, to-be-sent data based on the receiving capability information by using the precoding method provided in the first aspect or any possible design of the first aspect; and sending, by the transmit end device, the precoded to-be-sent data. In the precoding method provided in the first aspect or any possible design of the first aspect, a matrix R obtained by decomposing a channel matrix is an upper triangular matrix. In other words, after a plurality of data streams are encoded by using the precoding method, inter-stream interference is caused. With reference to the technical solution, the receive end device may cooperate to receive the data by using a non-linear receiving algorithm, to reduce or eliminate the inter-stream interference, and improve a probability of correct demodulation of multi-stream data. In addition, when the transmit end device uses the precoding method provided above, inter-stream interference is allowed, and the inter-stream interference may be reduced or eliminated by the receive end device. Therefore, when information transmission is performed by using the technical solution, a quantity of spatially multiplexed streams of a multi-antenna system can be increased, thereby providing a system capacity.

In a possible design, the method further includes: sending, by the transmit end device, indication information to the receive end device, where the indication information is used to indicate that the transmit end device precodes the to-be-sent data by using the precoding method provided in the first aspect or any possible design of the first aspect. This helps the receive end device to receive the precoded to-be-sent data by using a non-linear receiving algorithm supported by the receive end device, to reduce or eliminate inter-stream interference, and improve a probability of correct demodulation of multi-stream data. In addition, this helps increase a quantity of spatially multiplexed streams of a multi-antenna system, thereby providing a system capacity.

In a possible design, the method further includes: sending, by the transmit end device, indication information to the receive end device, where the indication information is used to indicate the receive end device to receive the to-be-sent data by using the non-linear receiving algorithm. This helps the receive end device to select a proper receiving algorithm, thereby improving a data demodulation probability.

In a possible design, if the transmit end device is a network device, and the receive end device is a terminal, any indication information above is carried in radio resource control (RRC) signaling, media access control (MAC) signaling, or downlink control information (DCI).

In a possible design, if the transmit end device is a terminal, and the receive end device is a network device, any indication information above is carried in RRC signaling, MAC signaling, or uplink control information (UCI).

In a possible design, the non-linear receiving algorithm includes a successive interference cancellation (SIC) algorithm, a maximum likelihood detection (MLD) algorithm, or the like.

According to a third aspect, an embodiment of this application provides an information transmission method, including: receiving, by a receive end device, indication information sent by a transmit end device, where the indication information is used to indicate that the transmit end device precodes to-be-sent data by using the precoding method provided in the first aspect or any possible design of the first aspect; and receiving, by the receive end device, the precoded to-be-sent data based on the indication information by using a non-linear receiving algorithm supported by the receive end device. For beneficial effects of the technical solution, refer to beneficial effects of the corresponding technical solution in the second aspect.

In a possible design, the method further includes: sending, by the receive end device, receiving capability information to the transmit end device, where the receiving capability information is used to indicate that the receive end device supports the non-linear receiving algorithm. For example, the non-linear receiving algorithm includes an SIC algorithm or an MLD algorithm.

According to a fourth aspect, an embodiment of this application provides an information transmission method, including: receiving, by a receive end device, indication information sent by a transmit end device, where the indication information is used to indicate the receive end device to receive data by using a non-linear receiving algorithm; and receiving, by the receive end device, data from the transmit end device based on the indication information by using the non-linear receiving algorithm. For beneficial effects of the technical solution, refer to beneficial effects of the corresponding technical solution in the second aspect.

In a possible design, the technical solution may be used in combination with the precoding method provided in the first aspect or any possible design of the first aspect, to reduce or eliminate inter-stream interference generated by the transmit end device by performing precoding by using the precoding method, thereby improving a probability of correct demodulation of multi-stream data.

In a possible design, before the receiving, by a receive end device, indication information sent by a transmit end device, the method further includes: sending, by the receive end device, receiving capability information to the transmit end device, where the receiving capability information is used to indicate that the receive end device supports the non-linear receiving algorithm. For example, the non-linear receiving algorithm includes an SIC algorithm or an MLD algorithm.

According to a fifth aspect, an embodiment of this application provides a precoding apparatus, configured to perform the precoding method provided in the first aspect or any possible design of the first aspect. The precoding apparatus may be specifically a transmit end device (for example, a network device or a terminal) or a chip.

In a possible design, the precoding apparatus includes modules configured to perform the precoding method provided in the first aspect or any possible design of the first aspect.

In another possible design, the precoding apparatus includes a memory and a processor. The memory is configured to store computer-executable instructions. When the apparatus runs, the processor executes the computer-executable instructions in the memory, to perform, by using a hardware resource in the apparatus, operation steps of the precoding method provided in the first aspect or any possible design of the first aspect.

According to a sixth aspect, an embodiment of this application provides a transmit end device, configured to perform the information transmission method provided in the second aspect or any possible design of the second aspect. The transmit end device may be specifically a network device, a terminal, or a chip.

In a possible design, the transmit end device includes modules configured to perform the information transmission method provided in the second aspect or any possible design of the second aspect.

In another possible design, the transmit end device includes a memory and a processor. The memory is configured to store computer-executable instructions. When the transmit end device runs, the processor executes the computer-executable instructions in the memory, to perform, by using a hardware resource in the transmit end device, operation steps of the information transmission method provided in the second aspect or any possible design of the second aspect.

According to a seventh aspect, an embodiment of this application provides a receive end device, configured to perform the information transmission method provided in the third aspect or any possible design of the third aspect. The receive end device may be specifically a network device, a terminal, or a chip.

In a possible design, the receive end device includes modules configured to perform the information transmission method provided in the third aspect or any possible design of the third aspect.

In another possible design, the receive end device includes a memory and a processor. The memory is configured to store computer-executable instructions. When the receive end device runs, the processor executes the computer-executable instructions in the memory, to perform, by using a hardware resource in the receive end device, operation steps of the information transmission method provided in the third aspect or any possible design of the third aspect.

According to an eighth aspect, an embodiment of this application provides a receive end device, configured to perform the information transmission method provided in the fourth aspect or any possible design of the fourth aspect. The receive end device may be specifically a network device, a terminal, or a chip.

In a possible design, the receive end device includes modules configured to perform the information transmission method provided in the fourth aspect or any possible design of the fourth aspect.

In another possible design, the receive end device includes a memory and a processor. The memory is configured to store computer-executable instructions. When the receive end device runs, the processor executes the computer-executable instructions in the memory, to perform, by using a hardware resource in the receive end device, operation steps of the information transmission method provided in the fourth aspect or any possible design of the fourth aspect.

An embodiment of this application further provides a computer-readable storage medium. The computer-readable storage medium stores a computer program. When the computer program runs on a computer, the computer is enabled to perform operation steps of the precoding method provided in the first aspect or any possible design of the first aspect.

An embodiment of this application further provides a computer-readable storage medium. The computer-readable storage medium stores a computer program. When the computer program runs on a computer, the computer is enabled to perform operation steps of the information transmission method provided in the second aspect to the fourth aspect or any possible design of the second aspect to the fourth aspect.

An embodiment of this application further provides a computer program product. When the computer program product runs on a computer, operation steps of the precoding method provided in the first aspect or any possible design of the first aspect are performed.

An embodiment of this application further provides a computer program product. When the computer program product runs on a computer, operation steps of the information transmission method provided in the second aspect to the fourth aspect or any possible design of the second aspect to the fourth aspect are performed.

It may be understood that any one of the precoding apparatus, the transmit end device, the receive end device, the computer-readable storage medium, the computer program product, or the like provided above is configured to perform the corresponding method provided above. Therefore, for beneficial effects that can be achieved, refer to beneficial effects in the corresponding method. Details are not described herein again.

DETAILED DESCRIPTION OF ILLUSTRATIVE EMBODIMENTS

Technical solutions provided in embodiments of this application may be applied to various communications systems, such as a 5G communications system, a future evolved system, or a plurality of harmonized communications systems, and may also be applied to an existing communications system or the like. The technical solutions provided in this application may be applied to a plurality of scenarios, for example, machine-to-machine (M2M), macro-micro communications, enhanced mobile broadband (eMBB), ultra-reliable and low-latency communication (uRLLC), and massive machine-type communications (mMTC) scenarios. These scenarios may include, but are not limited to, a scenario of communication between terminals, a scenario of communication between network devices, a scenario of communication between a network device and a terminal, and the like. The following uses the application scenario of communication between a network device and a terminal as an example for description.

Figure 1:
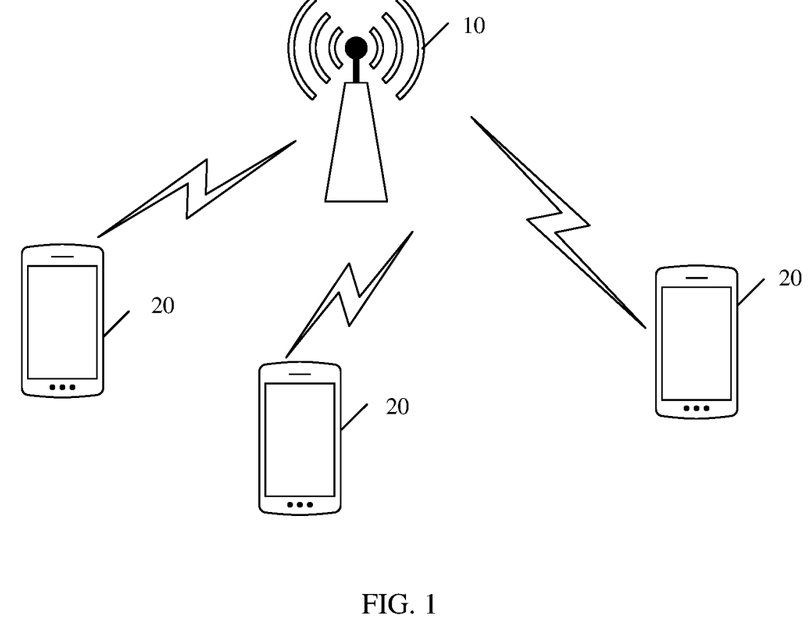
FIG. 1 is a schematic diagram of a communications system applicable to an embodiment of this application.

FIG. 1 is a schematic diagram of a communications system applicable to an embodiment of this application. The communications system may include one or more network devices 10 (only one is shown) and one or more terminals 20 connected to each network device 10. FIG. 1 is merely a schematic diagram, and does not constitute a limitation on an applicable scenario of the technical solutions provided in this application.

The network device 10 may be a transmission reception point (TRP), a base station, a relay station, an access point, or the like. The network device 10 may be a network device in a 5G communications system or a network device in a future evolved network, or may be a wearable device, a vehicle-mounted device, or the like. Alternatively, the network device 10 may be a base transceiver station (base transceiver station, BTS) in a global system for mobile communications (GSM) system or a code division multiple access (CDMA) network, or may be an NB (NodeB) in wideband code division multiple access (WCDMA), or may be an eNB or eNodeB (evolutional NodeB) in long term evolution (LTE). Alternatively, the network device 10 may be a radio controller in a cloud radio access network (CRAN) scenario.

The terminal 20 may be user equipment (UE) or client premises equipment (CPE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a 5G network, a terminal in a future evolved public land mobile network (PLMN), or the like.

Figure 2:
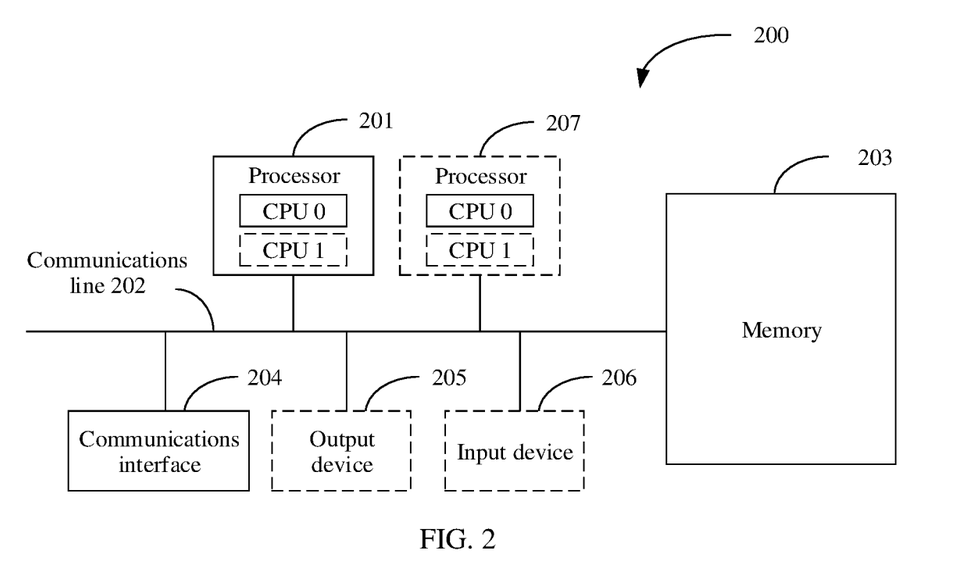
FIG. 2 is a schematic diagram of a hardware structure of a communications device applicable to an embodiment of this application.

Each network element in FIG. 1 may be implemented by using a communications device 200 in FIG. 2. The communications device 200 includes at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits configured to control program execution of the solutions of this application.

The communications line 202 may include a channel, to transfer information between the foregoing components.

The communications interface 204 uses any apparatus such as a transceiver to communicate with another device or a communications network such as an Ethernet, a RAN, or a wireless local area network (WLAN).

The memory 203 may be, but is not limited to, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, and a blue-ray disc, or the like), a magnetic disk storage medium or another magnetic storage device, or any other medium that can be used to carry or store expected program code in a form of instructions or a data structure and can be accessed by a computer. The memory may exist independently, and is connected to the processor by using the communications line 202. Alternatively, the memory may be integrated with the processor. The memory provided in this embodiment of this application may generally be non-volatile. The memory 203 is configured to store computer-executable instructions for executing the solutions of this application, and the processor 201 controls execution of the instructions. The processor 201 is configured to execute the computer-executable instructions stored in the memory 203, to implement a method provided in the following embodiment of this application.

Optionally, the computer-executable instructions in this embodiment of this application may also be referred to as application program code. This is not specifically limited in this embodiment of this application.

During specific implementation, in an embodiment, the communications device 200 may include a plurality of processors, for example, the processor 201 and a processor 207 shown in FIG. 2. Each of these processors may be a single-CPU processor, or may be a multi-CPU processor. The processor herein may be one or more devices, circuits, and/or processing cores configured to process data (for example, computer program instructions).

During specific implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive user input in a plurality of manners. For example, the input device 206 may be a mouse, a keyboard, a touchscreen device, or a sensing device.

It should be noted that any technical solution provided in the embodiments of this application may be applied to a downlink transmission scenario, and may also be applied to an uplink transmission scenario. In an application scenario of downlink transmission, a transmit end device may be a network device, and a receive end device may be a terminal. A device of a structure similar to that in FIG. 2 is applied. A type of the communications device 200 is not limited in this embodiment of this application.

It should be noted that the technical solutions provided in the embodiments of this application may be applied to a downlink transmission scenario, and may also be applied to an uplink transmission scenario. In an application scenario of downlink transmission, a transmit end device may be a network device, and a receive end device may be a terminal. In an application scenario of uplink transmission, a transmit end device may be a terminal, and a receive end device may be a network device. For any one of the following embodiments, after a transmit end device (or a receive end device) is replaced with a network device, a network device in this embodiment and the replaced network device may represent a same network device. After the transmit end device (or the receive end device) is replaced with a terminal, a terminal in this embodiment and the replaced terminal may represent a same terminal. A unified explanation is provided herein, and it is not repeated below.

The technical solutions provided in the embodiments of this application may be applied to a time division duplex (TDD) system, and may also be applied to a frequency division duplex system.

The technical solutions provided in the embodiments of this application are described by using an example in which a network device schedules a terminal, and the terminal spatially multiplexes a plurality of data streams. In addition, a manner of multiplexing a transmission resource (for example, a time-frequency resource or a space resource) between the terminal and another terminal is not limited in the embodiments of this application.

It should be noted that, unless otherwise described, diagonal elements of a matrix in the embodiments of this application are all elements on a main diagonal of the matrix. A unified explanation is provided herein, and it is not repeated below.

Figure 3:
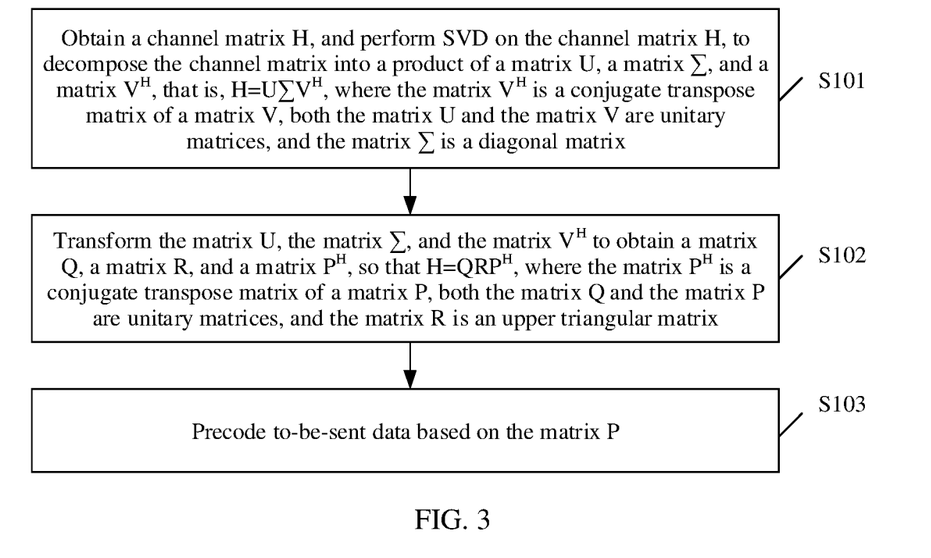
FIG. 3 is a schematic flowchart of a precoding method according to an embodiment of this application.

FIG. 3 is a schematic flowchart of a precoding method according to an embodiment of this application. In this embodiment, the method is performed by a transmit end device. The method shown in FIG. 3 may include the following steps.

S101: Obtain a channel matrix H, and perform SVD on the channel matrix H, to decompose the channel matrix into a product of a matrix U, a matrix $\Sigma$, and a matrix $V^H$, that is, $H=U\Sigma V^H$. The matrix $V^H$ is a conjugate transpose matrix of a matrix V, both the matrix U and the matrix V are unitary matrices, and the matrix $\Sigma$ is a diagonal matrix. For a specific implementation process of S101, refer to a conventional technology. Details are not described herein.

If an n-order complex matrix A meets $A^H A = AA^H = E$, the matrix A is a unitary matrix. $A^H$ is a conjugate transpose matrix of the matrix A. E is an identity matrix.

The diagonal matrix is a matrix in which all elements other than elements on a main diagonal are 0, and the elements on the diagonal may be 0 or non-zero values.

S102: Transform the matrix U, the matrix $\Sigma$, and the matrix $V^H$ to obtain a matrix Q, a matrix R, and a matrix $P^H$, so that $H=QRP^H$. The matrix $P^H$ is a conjugate transpose matrix of a matrix P, both the matrix Q and the matrix P are unitary matrices, and the matrix R is an upper triangular matrix.

The upper triangular matrix is a square matrix in which all elements below a main diagonal are zeros.

The matrix P is a precoding matrix. Generally, one column vector in the precoding matrix corresponds to one data stream, and the column vector is used to precode data in the data stream. Based on this, when applied to the technical solution provided in this embodiment of this application, in an example, a quantity of columns of the precoding matrix P may be a quantity of data streams that is determined by a network device for a terminal in a current scheduling periodicity. The column vector herein may be replaced with a row vector, and correspondingly, the quantity of columns may be replaced with a quantity of rows.

All data streams corresponding to the precoding matrix P may correspond to a same codeword, or may correspond to a plurality of different codewords. In addition, a quantity of data streams corresponding to a same codeword is not limited in this embodiment of this application. For example, it is stipulated in a 5G NR protocol that when a quantity of data streams is less than or equal to 4, a same codeword is used.

A value of each diagonal element of the matrix R represents an equivalent channel gain of a data stream.

Optionally, a ratio of at least two diagonal elements of the matrix R is a target ratio, and the target ratio is determined based on a code rate. The code rate is a concept in channel coding and decoding, and is used to indicate redundancy of channel coding. A value of the code rate ranges from 0 to 1. Generally, a smaller code rate indicates higher redundancy of channel coding, and a larger code rate indicates lower redundancy of coding.

Optionally, a larger code rate indicates that the target ratio is closer to 1:1: . . . :1. In other words, values of A1, A2, . . . and At are closer to each other. Similarly, a smaller code rate indicates that the target ratio is farther from 1:1: . . . :1. In other words, values of A1, A2, . . . and At are more different from each other. This helps improve overall performance of a plurality of data streams corresponding to a same codeword.

The "at least two diagonal elements" may be a plurality of any diagonal elements of the matrix R. Optionally, the "at least two diagonal elements" are the first to $t^{th}$ diagonal elements in the matrix R, $t \leq K$, and K is a quantity of diagonal elements of the matrix R. Both t and K are integers. The following descriptions are all made by using an example in which the at least two diagonal elements are the first to $t^{th}$ diagonal elements in the matrix R.

For example, if a ratio of the first to $t^{th}$ diagonal elements of the matrix R is $$r_{1,1} : r_{2,2} : r_{k,k} : \cdots : r_{t,t} = A_1 : A_2 : \cdots : A_k : \cdots : A_t,$$

where $r_{k,k}$ is a $k^{th}$ diagonal element of the matrix R, $1 \leq k \leq t$, and k is an integer, $r_{k,k} = A_k \theta$, where $\theta$ is determined based on a non-zero singular value obtained through SVD on the channel matrix H. For example, $\theta$ is obtained based on an average value, that is, $(\sqrt[t]{\prod_{j=1}^{t} \lambda_j})^{1/t}$, of products of the first t non-zero singular values obtained through SVD on the channel matrix H, where $\lambda_j$ is a $j^{th}$ non-zero singular value obtained through SVD on the channel matrix H, and $j = 1, 2, \ldots, t$. For example, $$\theta = \left(\frac{1}{\prod_{j=1}^{t} A_j}\right)^{1/t} \left(\prod_{j=1}^{t} \lambda_j\right)^{1/t},$$

Certainly, this embodiment of this application is not limited thereto.

In some embodiments of this application, a ratio of all the diagonal elements of the matrix R is a target ratio. That is, t=K.

A manner of obtaining the target ratio is not limited in this embodiment of this application. For example, the target ratio may be determined based on overall performance of a plurality of data streams corresponding to a single codeword.

A manner of obtaining the target ratio is not limited in this embodiment of this application. For example, the target ratio may be predefined, or may be determined by the transmit end device based on a channel decoder model. The target ratio varies with different code rates.

Optionally, a non-zero singular value obtained through SVD on the channel matrix H and a diagonal element in a diagonal matrix (that is, the matrix Σ) obtained through SVD on the channel matrix H meet the following condition:

$$\begin{cases} \lambda_1 > \sigma_1 \\ \lambda_2 < \sigma_2 < \frac{\lambda_1 \lambda_2}{\sigma_1} \\ \vdots \\ \lambda_{t-1} < \sigma_{t-1} < \frac{\lambda_1 \lambda_2 \cdots \lambda_{t-1}}{\sigma_1 \sigma_2 \cdots \sigma_{t-1}}, \end{cases}$$

where $\lambda_k$ is a $k^{th}$ non-zero singular value obtained through SVD on the channel matrix H, $\sigma_k$ is $A_k \theta$, and $1 \leq k \leq t \leq K$. Certainly, this embodiment of this application is not limited thereto.

S101 and S102 are a specific implementation of "obtaining a channel matrix H, and decomposing the channel matrix H to obtain $QRP^H$". Certainly, during specific implementation, this embodiment of this application is not limited thereto. In this embodiment of this application, a process of decomposing the channel matrix to obtain $QRP^H$ may be referred to as performing diagonal element arbitrary ratio decomposition (DEAR) on the channel matrix.

S103: Precode to-be-sent data based on the matrix P. The to-be-sent data is to-be-sent data in a plurality of data streams corresponding to the matrix P.

In the precoding method provided in this embodiment of this application, a ratio of at least two diagonal elements of the matrix R obtained by decomposing the channel matrix can be the target ratio. In this way, through precoding with the precoding method provided in this embodiment of this application, equivalent channel gains of a plurality of spatially multiplexed data streams can meet a ratio. In other words, performance of the plurality of spatially multiplexed data streams can be adjusted to the target ratio. Therefore, by rationally setting the target ratio, overall performance of data streams corresponding to a codeword can be improved. For example, four data streams are spatially multiplexed. The target ratio may be set, so that performance differences between the four data streams are small, thereby improving overall performance.

In some implementations, assuming that K diagonal elements in the matrix R meet the target ratio, that is, t=K, S102 may include: first, using the matrix Σ as an initial matrix $R_0$ of the matrix R, using the matrix U as an initial matrix $Q_0$ of the matrix Q, and using the matrix V as an initial matrix $P_0$ of the matrix P; and then, assigning $\sigma_k$ to a $k^{th}$ diagonal element $r_{k,k}$ in a matrix $R_{k-1}$, and traversing each value of $k=1, 2, \ldots, K-1$, where $\sigma_k$ is $A_k \theta$, so that diagonal elements of the matrix R are $A_1 \theta, A_2 \theta, \ldots,$ and $A_K \theta$. In other words, the diagonal elements of the matrix R meet the target ratio $A_1 : A_2 : \ldots : A_K$. In addition, in a process of traversing each value of $k=1, 2, \ldots, K-1$, a submatrix formed by an intersection of $k^{th}$ and $(k+1)^{th}$ rows and $k^{th}$ and $(k+1)^{th}$ columns is implemented as an upper triangular matrix, to obtain the matrix R (denoted by a matrix $R_k$), the matrix Q (denoted by a matrix $Q_k$), and the matrix P (denoted by a matrix $P_k$) that make the equation $H = QRP^H$ true.

It may be understood that $R_{K-1}$, $Q_{K-1}$, and $P_{K-1}$ obtained when k=K−1 are the matrix R, the matrix Q, and the matrix P, respectively.

Optionally, steps performed in traversing each value of $k=1, 2, \ldots, K-1$ may include the following steps 1 to 4.

Step 1: Find a diagonal element $r_{p,p}$ from a matrix $R_{k-1}$ based on a magnitude relationship between $\sigma_k$ and a $k^{th}$ diagonal element $r_{k,k}$ in the matrix $R_{k-1}$, where $k < p \leq K$, p is an integer, and $\sigma_k$ is $A_k \theta$; if $r_{k,k} \geq \sigma_k$, $r_{p,p} \leq \sigma_k$; and if $r_{k,k} < \sigma_k$, $r_{p,p} > \sigma_k$.

$r_{p,p}$ may be any element meeting the condition "k<p≤K; if $r_{k,k} \geq \sigma_k$, $r_{p,p} \leq \sigma_k$; and if $r_{k,k} < \sigma_k$, $r_{p,p} > \sigma_k$, or may be an element with a smallest value of p that meets the condition.

Step 2: Switch diagonal elements $r_{k+1,k+1}$ and $r_{p,p}$ in the matrix $R_{k-1}$, to obtain a matrix $R_{re\_k}$, switch a $(k+1)^{th}$ column of elements and a $p^{th}$ column of elements in a matrix $Q_{k-1}$ to obtain a matrix $Q_{re\_k}$, and switch a $(k+1)^{th}$ column of elements and a $p^{th}$ column of elements in a matrix $P_{k-1}$ to obtain a matrix $P_{re\_k}$.

Assuming that $r_{k+1,k+1}$=a and $r_{p,p}$=b, that is, in the matrix $R_{k-1}$, an $(k+1)^{th}$ diagonal element is a and a $p^{th}$ diagonal element is b, after $r_{k+1,k+1}$ and $r_{p,p}$ are switched, $r_{k+1,k+1}$=b and $r_{p,p}$=a, that is, in the matrix $R_{re\_k}$, an $(k+1)^{th}$ diagonal element is b, and a $p^{th}$ diagonal element is a. Similarly, a meaning of switching two columns of elements may be obtained. It may be understood that elements (including two elements or two columns of elements) in a matrix may be switched by multiplying the matrix by a "permutation matrix". For a specific implementation thereof, refer to a conventional technology. Details are not described herein.

A sequence of performing the three switching operations in step 2 is not limited in this embodiment of this application.

A principle of "switching diagonal elements $r_{k+1,k+1}$ and $r_{p,p}$ in the matrix $R_{k-1}$" in step 2 is as follows: Steps 1 to 4 are performed at this time to assign $\sigma_k$ to the element $r_{k,k}$ in the matrix $R_{k-1}$ and ensure $H=Q_k R_k P_k^H$. Therefore, if $r_{k,k} \geq \sigma_k$, the $(k+1)^{th}$ diagonal element in the matrix $R_k$ is made less than or equal to $\sigma_k$, so that $H=Q_k R_k P_k^H$. Similarly, if $r_{k,k} < \sigma_k$, the $(k+1)^{th}$ diagonal element in the matrix $R_k$ is made greater than $\sigma_k$, so that $H=Q_k R_k P_k^H$. The "switching a $(k-1)^{th}$ column of elements and a $p^{th}$ column of elements in a matrix $Q_{k-1}$, and switching a $(k-1)^{th}$ column of elements and a $p^{th}$ column of elements in a matrix $P_{k-1}$" in step 2 helps $H=Q_k R_k P_k^H$.

Step 3: Construct a matrix $G_1$ and a matrix $G_2$ based on $\sigma_k$ and a $k^{th}$ diagonal element and a $(k+1)^{th}$ diagonal element in the matrix $R_{re\_k}$, where the matrix $G_1$ and the matrix $G_2$ make a submatrix (referred to as a target submatrix below, where the target submatrix is a 2*2 submatrix) formed by an intersection of $k^{th}$ and $(k+1)^{th}$ rows and $k^{th}$ and $(k+1)^{th}$ columns in $G_2^T R_{re\_k} G_1$ be an upper triangular matrix, a first diagonal element ((that is, the $k^{th}$ diagonal element in $R_{re\_k}$, where the element is also a $k^{th}$ diagonal element in the matrix $R_k$) of the submatrix is $\sigma_k$, and $G_2^T$ is a transpose matrix of the matrix $G_2$.

The $k^{th}$ diagonal element in the matrix $R_{re\_k}$ is the $k^{th}$ diagonal element in the matrix $R_{k-1}$ (that is, $r_{k,k}$). The $(k+1)^{th}$ diagonal element in the matrix $R_{re\_k}$ is the $p^{th}$ diagonal element in the matrix $R_{k-1}$ (that is, $r_{p,p}$). Therefore, it can be learned that step 3 may be performed immediately after step 1. In other words, a sequence of performing step 2 and step 3 is not limited in this embodiment of this application.

Step 4: Obtain a matrix $R_k$ based on a formula $R_k = G_2^T R_{re\_k} G_1$, obtain a matrix $Q_k$ based on a formula $Q_k = Q_{re\_k} G_2$, and obtain a matrix $P_k$ based on a formula $P_k = P_{re\_k} G_1$.

Subsequently, a matrix $R_{K-1}$ obtained after steps 1 to 4 are performed at a $(K-1)^{th}$ time may be used as the matrix R, a matrix $Q_{K-1}$ obtained after steps 1 to 4 are performed at the $(K-1)^{th}$ time may be used as the matrix Q, and a matrix $P_{K-1}$ obtained after steps 1 to 4 are performed at the $(K-1)^{th}$ time may be used as the matrix P.

It may be understood that the foregoing description of the specific implementation of S102 is described based on an example in which the diagonal elements of the matrix R are to meet the target ratio. In actual implementation, if the ratio of the first to $t^{th}$ diagonal elements of the matrix R is to be implemented as the target ratio, where $t \leq K$, t is an integer, and K is the quantity of diagonal elements of the matrix R, the transmit end device may perform the foregoing steps 1 to 4 only $t-1$ times. Optionally, the first t columns of a matrix $P_{t-1}$ obtained after the $(t-1)^{th}$ time may be used as a precoding matrix.

Optionally, when step 3 is performed, the matrix $G_1$ and the matrix $G_2$ may be constructed based on the following formulas:

$$G_1 = \frac{1}{\sigma_k}\begin{bmatrix} c\delta_1 & s\delta_2 \\ -s\delta_2 & c\delta_1 \end{bmatrix} \text{ and } G_2 = \begin{bmatrix} c & s \\ -s & c \end{bmatrix}.$$

-continued $$c = \sqrt{\frac{\sigma_k^2 - \delta_2^2}{\delta_1^2 - \delta_2^2}}, \; s = \sqrt{1-c^2},$$

$\delta_1$ is the $k^{th}$ diagonal element in the matrix $R_{re\_k}$ (that is, the $k^{th}$ diagonal element $r_{k,k}$ in the matrix $R_{k-1}$), and $\delta_2$ is the $(k+1)^{th}$ diagonal element in the matrix $R_{re\_k}$ (that is, the $p^{th}$ diagonal element $r_{p,p}$ in the matrix $R_{k-1}$).

The following analyzes rationality of constructing the matrix $G_1$ and the matrix $G_2$ in this optional implementation.

In order that the target submatrix is an upper triangular matrix in which a first diagonal element is $\sigma_k$, the following formula may be obtained through Givens rotation:

$$\frac{1}{\sigma_k}\begin{bmatrix} c\delta_1 & s\delta_2 \\ -s\delta_2 & c\delta_1 \end{bmatrix}\begin{bmatrix} \delta_1 & \\ & \delta_2 \end{bmatrix}\begin{bmatrix} c & s \\ -s & c \end{bmatrix} = \begin{bmatrix} \sigma_k & x \\ 0 & y \end{bmatrix}$$

where a right side of the equation is the target submatrix, y is the $(k+1)^{th}$ diagonal element in the matrix $R_{re\_k}$, that is, the $p^{th}$ diagonal element $r_{p,p}$ in the matrix $R_{k-1}$, and a value of x is determined by a formula on a left side of the equation.

Based on this, it can be learned that the target submatrix may be constructed by constructing $$G_1 = \frac{1}{\sigma_k}\begin{bmatrix} c\delta_1 & s\delta_2 \\ -s\delta_2 & c\delta_1 \end{bmatrix} \text{ and } G_2 = \begin{bmatrix} c & s \\ -s & c \end{bmatrix}$$

based on $\sigma_k$ and a $k^{th}$ diagonal element (that is, $\delta_1$) and a $(k-1)^{th}$ diagonal element (that is, $\delta_2$) in the matrix $R_{re\_k}$.

It may be understood that this optional implementation is merely an implementation of constructing a target submatrix, and the target submatrix may be constructed in another manner.

Figure 4:
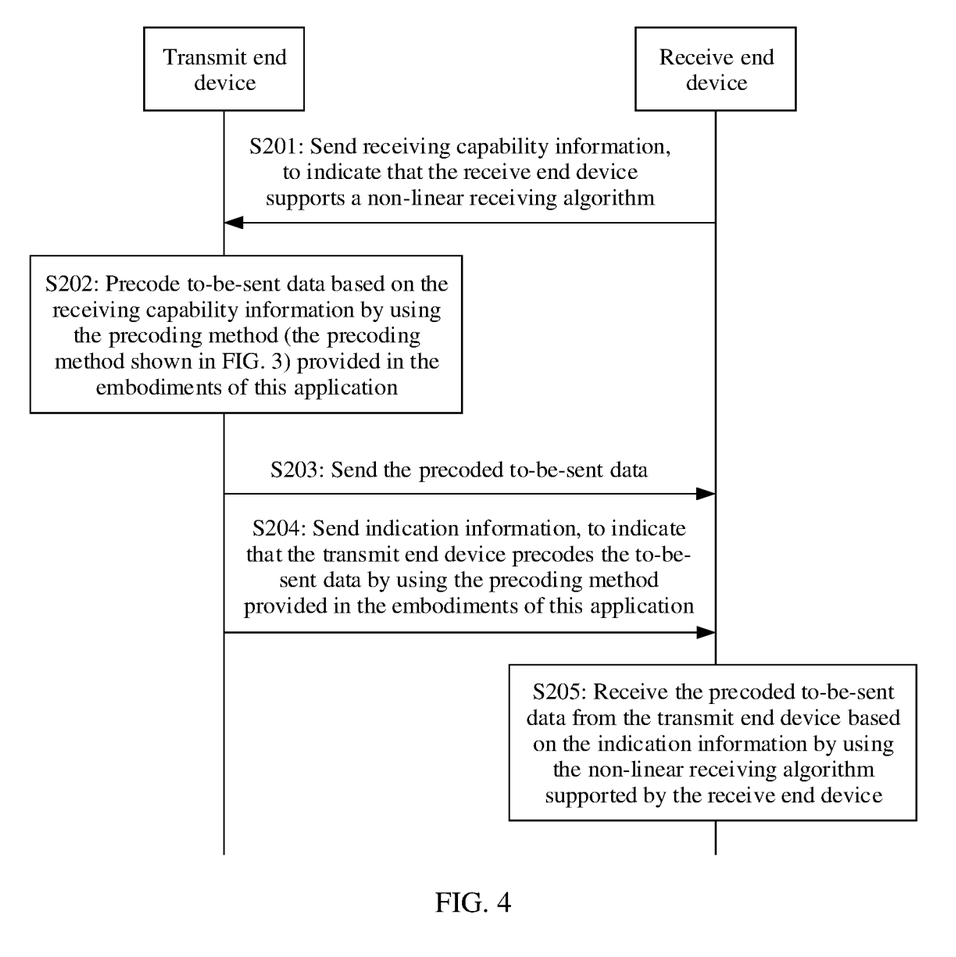
FIG. 4 is a schematic interaction diagram of an information transmission method according to an embodiment of this application.

FIG. 4 is a schematic interaction diagram of an information transmission method according to an embodiment of this application. The method shown in FIG. 4 includes the following steps.

S201: A receive end device sends receiving capability information to a transmit end device, where the receiving capability information is used to indicate that the receive end device supports a non-linear receiving algorithm.

For example, the non-linear receiving algorithm includes an SIC algorithm, an MLD algorithm, or the like.

In this embodiment of this application, a message in which the receiving capability information is carried is not specifically limited. For example, if the transmit end device is a network device, and the receive end device is a terminal, the receiving capability information may be carried in RRC signaling, MAC signaling, or DCI. For another example, if the transmit end device is a terminal, and the receive end device is a network device, the receiving capability information may be carried in RRC signaling, MAC signaling, or UCI. It may be understood that, because the receiving capability information of the receive end device generally remains unchanged in a period of time, optionally, the receiving capability information may be generally carried in RRC signaling or MAC signaling for transmission.

It may be understood that the receive end device may support one or more receiving algorithms, which may include a non-linear receiving algorithm, and may also include a linear receiving algorithm. For example, the receive end device supports MLD, SIC, minimum mean square error (MMSE), and interference rejection combining (interference rejection combining, IRC) algorithms. For another example, the receive end device supports only an MMSE algorithm.

In an implementation, the receiving capability information in S201 is specifically used to indicate information that the receive end device supports a non-linear receiving algorithm. For example, assuming that the receiving capability information of the receive end device is carried in RRC signaling, a flag bit may be set in the RRC signaling. If the receive end device supports a non-linear receiving algorithm, the flag is set to 1. If the receive end device supports a linear receiving algorithm, the flag is set to 0. Certainly, this embodiment of this application is not limited thereto.

In another implementation, the receiving capability information in S201 is specifically used to indicate identification information of a non-linear receiving algorithm supported by the receive end device. For example, the receiving capability information may be used to indicate that the receive end device supports two non-linear receiving algorithms: MLD and SIC.

S202: The transmit end device precodes to-be-sent data based on the receiving capability information by using the precoding method (the precoding method shown in FIG. 3) provided in the embodiments of this application.

It may be understood that, if the receive end device receives data by using a non-linear receiving algorithm, when precoding to-be-sent data, the transmit end device may retain some inter-stream interference, and the inter-stream interference may be reduced or eliminated when the receive end device executes the non-linear receiving algorithm. The inter-stream interference may be represented in that a matrix R (that is, the matrix R described above) obtained by decomposing a channel matrix is an upper triangular matrix, and does not need to be a diagonal matrix. Therefore, the transmit end device may precode the to-be-sent data by using the precoding method provided in the embodiments of this application.

S203: The transmit end device sends the precoded to-be-sent data.

If the transmit end device is a network device, and the receive end device is a terminal, S203 may include: sending, by the transmit end device, the precoded to-be-sent data through a physical downlink shared channel (PDSCH). Alternatively, if the transmit end device is a terminal, and the receive end device is a network device, S203 may include: sending, by the transmit end device, the precoded to-be-sent data through a physical uplink shared channel (PUSCH).

S204: The transmit end device sends indication information to the receive end device, where the indication information is used to indicate that the transmit end device precodes the to-be-sent data by using the precoding method (the precoding method shown in FIG. 3) provided in the embodiments of this application.

If the transmit end device is a network device, and the receive end device is a terminal, the indication information is carried in radio resource control RRC signaling, media access control MAC signaling, or downlink control information DCI. Alternatively, if the transmit end device is a terminal, and the receive end device is a network device, the indication information is carried in RRC signaling, MAC signaling, or uplink control information UCI.

A sequence of performing S203 and S204 is not limited in this embodiment of this application. For example, S203 may be performed before S204, or S204 may be performed before S203, or S203 and S204 may be performed at the same time.

S205: The receive end device receives the precoded to-be-sent data from the transmit end device based on the indication information by using the non-linear receiving algorithm supported by the receive end device. For example, received data is equalized based on the non-linear receiving algorithm supported by the receive end device, so that data streams mixed together at the transmit end device are separated into independent data streams, and inter-stream interference is reduced or eliminated in this process. Subsequently, operations such as demodulation and channel decoding may be performed on each data stream.

S204 and S205 are optional steps.

If S204 and S205 are not performed, in an implementation, when the receive end device supports only the non-linear receiving algorithm, the receive end device may directly receive the data by using the supported receiving algorithm. In another implementation, when the receive end device further supports the linear receiving algorithm, the receive end device may compare a performance gain of receiving the data by using the non-linear receiving algorithm with a performance gain of receiving the data by using the linear receiving algorithm, to choose to receive the data by using the non-linear receiving algorithm. Certainly, this embodiment of this application is not limited thereto. For example, the receive end device may alternatively receive the data by using the non-linear receiving algorithm in the following method shown in FIG. 5.

It may be understood that, in the precoding method provided above, a matrix R obtained by decomposing a channel matrix is an upper triangular matrix. In other words, after a plurality of data streams are encoded by using the precoding method, inter-stream interference is caused. In this embodiment, the receive end device may cooperate to receive the data by using the non-linear receiving algorithm, to reduce or eliminate the inter-stream interference, thereby improving a probability of correct demodulation of multi-stream data. In addition, when the transmit end device uses the precoding method provided above, inter-stream interference is allowed, and the inter-stream interference may be reduced or eliminated by the receive end device. Therefore, when information transmission is performed by using this embodiment, a quantity of spatially multiplexed streams of a multi-antenna system can be increased, thereby providing a system capacity.

Figure 5:
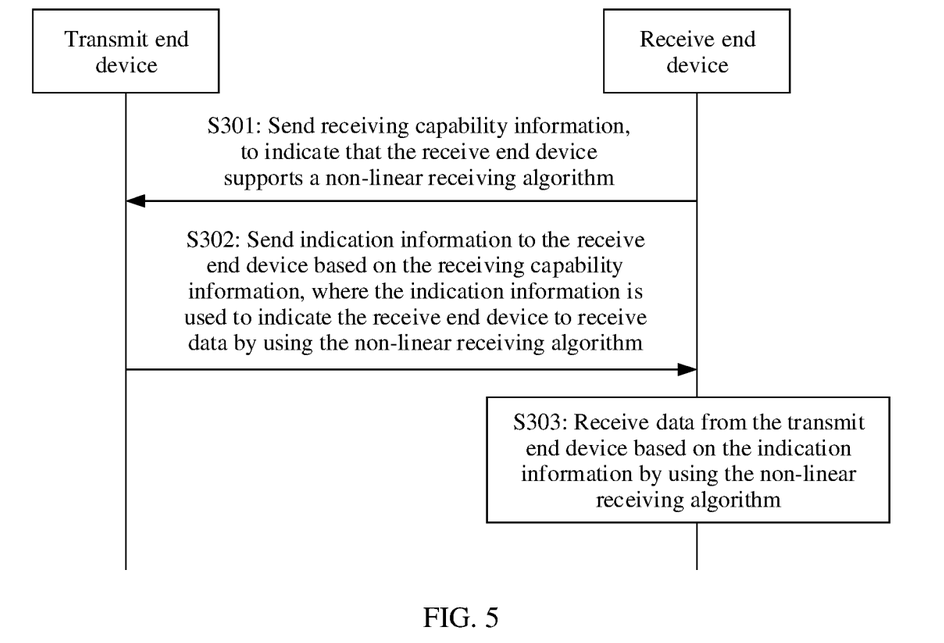
FIG. 5 is a schematic interaction diagram of an information transmission method according to an embodiment of this application.

FIG. 5 is a schematic interaction diagram of an information transmission method according to an embodiment of this application. The method shown in FIG. 5 includes the following steps.

S301: A receive end device sends receiving capability information to a transmit end device, where the receiving capability information is used to indicate that the receive end device supports a non-linear receiving algorithm. For a specific implementation of S301, refer to S201. Details are not described herein again.

S302: The transmit end device sends indication information to the receive end device based on the receiving capability information, where the indication information is used to indicate the receive end device to receive data by using the non-linear receiving algorithm.

The non-linear receiving algorithm may include an SIC algorithm, an MLD algorithm, or the like.

In an implementation, the indication information is specifically used to indicate the receive end device to receive data by using a non-linear receiving algorithm instead of a linear receiving algorithm. In other words, in this embodiment of this application, the transmit end device is supported in configuring, for the receive end device, whether the receive end device is to receive data by using a non-linear receiving algorithm. The method may be applied to a scenario in which the receive end device supports a linear receiving algorithm and a non-linear receiving algorithm. Based on the scenario, the receive end device may support one or more non-linear receiving algorithms.

In another implementation, the indication information is specifically used to indicate a non-linear receiving algorithm to be used by the receive end device to receive data. This manner may be applied to a scenario in which the receive end device supports at least two non-linear receiving algorithms.

S303: The receive end device receives data from the transmit end device based on the indication information by using the non-linear receiving algorithm. Optionally, the data is data obtained by the transmit end device by performing precoding by using the precoding method provided in the embodiments of this application.

If the transmit end device is a network device, and the receive end device is a terminal, the indication information is carried in RRC signaling, MAC signaling, or DCI. Alternatively, if the transmit end device is a terminal, and the receive end device is a network device, the indication information is carried in RRC signaling, MAC signaling, or uplink control information UCI.

In this embodiment, the transmit end device sends the indication information to the receive end device, to indicate the non-linear receiving algorithm to be used by the receive end device. This helps the receive end device to select a proper receiving algorithm, thereby improving a data demodulation probability. The method may be used in combination with the precoding method provided in the embodiments of this application, to reduce or eliminate inter-stream interference generated by the transmit end device by performing precoding by using the precoding method provided in the embodiments of this application, thereby improving a probability of correct demodulation of multi-stream data.

The solutions provided in the embodiments of this application are mainly described above from a perspective of a method. To implement the foregoing functions, corresponding hardware structures and/or software modules for performing the functions are included. A person skilled in the art should easily be aware that, in combination with units and algorithm steps of the examples described in the embodiments disclosed in this specification, this application may be implemented by using hardware or a combination of hardware and computer software. Whether a function is performed by using hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the precoding apparatus, the transmit end device, or the receive end device based on the foregoing method examples. For example, each function module may be obtained through division corresponding to each function, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 6:
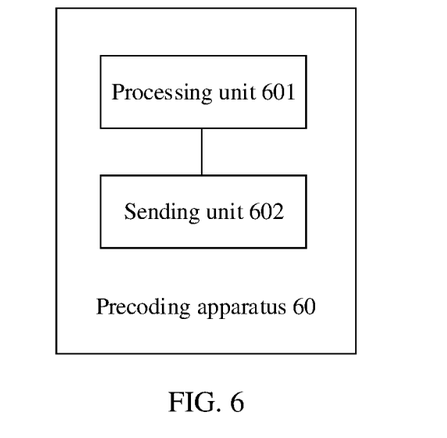
FIG. 6 is a schematic structural diagram of a precoding apparatus according to an embodiment of this application.

FIG. 6 is a schematic structural diagram of a precoding apparatus 60 according to an embodiment of this application. In an example, the precoding apparatus 60 may be a transmit end device (for example, a network device or a terminal). In an example, the precoding apparatus 60 may be configured to perform the precoding method shown in FIG. 3. The precoding apparatus 60 may include a processing unit 601 and a sending unit 602.

The processing unit 601 is configured to decompose a channel matrix into a product of a matrix Q, a matrix R, and a matrix $P^H$, where the matrix $P^H$ is a conjugate transpose matrix of a matrix P, both the matrix Q and the matrix P are unitary matrices, and the matrix R is an upper triangular matrix. The sending unit 602 is configured to precode to-be-sent data based on the matrix P. For example, with reference to FIG. 3, the processing unit 601 may be configured to perform S102, and the sending unit 602 may be configured to perform S103.

Optionally, a ratio of at least two diagonal elements of the matrix R is a target ratio, and the target ratio is determined based on a code rate.

Optionally, if a ratio of diagonal elements of the matrix R is $r_{1,1}:r_{2,2}:\ldots:r_{k,k}:\ldots:r_{t,t}=A_1:A_2:\ldots:A_k:\ldots:A_t$, where $r_{k,k}$ is a $k^{th}$ diagonal element of the matrix R, $1 \leq k \leq t \leq K$, both k and t are integers, and K is a quantity of diagonal elements of the matrix R, $r_{k,k}=A_k\theta$, where $\theta$ is determined based on a non-zero singular value obtained through SVD on the channel matrix.

Optionally, $$\theta = \left(\frac{1}{\prod_{j=1}^{t} A_j}\right)^{1/t} \left(\prod_{j=1}^{t} \lambda_j\right)^{1/t},$$

where $\lambda_j$ is a $j^{th}$ non-zero singular value obtained through SVD on the channel matrix, and j=1, 2, ..., t. Π represents a product operation.

Optionally, t≥2, and a non-zero singular value obtained through SVD on the channel matrix and a diagonal element in a diagonal matrix obtained through SVD on the channel matrix meet the following condition:

$$\begin{cases} \lambda_1 > \sigma_1 \\ \lambda_2 < \sigma_2 < \frac{\lambda_1 \lambda_2}{\sigma_1} \\ \vdots \\ \lambda_{t-1} < \sigma_{t-1} < \frac{\lambda_1 \lambda_2 \cdots \lambda_{t-1}}{\sigma_1 \sigma_2 \cdots \sigma_{t-1}}, \end{cases}$$

where $\lambda_k$ is a $k^{th}$ non-zero singular value obtained through SVD on the channel matrix, $\sigma_k$ is $A_k\theta$, and $1 \leq k \leq t \leq K$.

Optionally, the processing unit 601 is specifically configured to: perform SVD on the channel matrix, to decompose the channel matrix into a product of a matrix U, a matrix Σ, and a matrix $V^H$, where the matrix $V^H$ is a conjugate transpose matrix of a matrix V, both the matrix U and the matrix V are unitary matrices, and the matrix Σ is a diagonal matrix; and transform the matrix U, the matrix Σ, and the matrix $V^H$ to obtain the matrix Q, the matrix R, and the matrix $P^H$. For example, with reference to FIG. 3, the processing unit 601 may be configured to perform S101 and S102.

Optionally, the target ratio is a ratio of the first to $t^{th}$ diagonal elements in the matrix R, where $1 \leq k \leq t \leq K$, both k and t are integers, and K is a quantity of diagonal elements of the matrix R. Based on this, when transforming the matrix U, the matrix $\Sigma$, and the matrix $V^H$ to obtain the matrix Q, the matrix R, and the matrix $P^H$, the processing unit 601 is specifically configured to:

first, use the matrix $\Sigma$ as an initial matrix $R_0$ of the matrix R;

then, traverse each value of k=1, 2, . . . , t−1, where $1 \leq k \leq t \leq K$, both k and t are integers, and K is the quantity of diagonal elements of the matrix R; and perform the following steps 1 to 4:

step 1: finding a diagonal element $r_{p,p}$ from a matrix $R_{k-1}$ based on a magnitude relationship between $\sigma_k$ and a $k^{th}$ diagonal element $r_{k,k}$ in the matrix $R_{k-1}$, where k<p≤K, p is an integer, and $\sigma_k$ is $A_k\theta$; if $r_{k,k} \geq \sigma_k$, $r_{p,p} \leq \sigma_k$; and if $r_{k,k} < \sigma_k$, $r_{p,p} > \sigma_k$;

step 2: switching diagonal elements $r_{k+1,k+1}$ and $r_{p,p}$ in the matrix $R_{k-1}$, to obtain a matrix $R_{re\_k}$;

step 3: constructing a matrix $G_1$ and a matrix $G_2$ based on $\sigma_k$ and a $k^{th}$ diagonal element and a $(k+1)^{th}$ diagonal element in the matrix $R_{re\_k}$, where the matrix $G_1$ and the matrix $G_2$ make a submatrix formed by an intersection of $k^{th}$ and $(k+1)^{th}$ rows and $k^{th}$ and $(k+1)^{th}$ columns in $G_2^T R_{re\_k} G_1$ be an upper triangular matrix, a first diagonal element of the submatrix is $\sigma_k$, and $G_2^T$ is a transpose matrix of the matrix $G_2$; and step 4: obtaining a matrix $R_k$ based on a formula $R_k = G_2^T R_{re\_k} G_1$; and next, use, as the matrix R, a matrix $R_{t-1}$ obtained after steps 1 to 4 are performed at a $(t-1)^{th}$ time.

Optionally, when constructing the matrix $G_1$ and the matrix $G_2$ based on k and the $k^{th}$ diagonal element and the $(k+1)^{th}$ diagonal element in the matrix $R_{re\_k}$, the processing unit 601 is specifically configured to: construct the matrix $G_1$ and the matrix $G_2$ based on the following formula:

$$G_1 = \frac{1}{\sigma_k}\begin{bmatrix} c\delta_1 & s\delta_2 \\ -s\delta_2 & c\delta_1 \end{bmatrix} \text{ and } G_2 = \begin{bmatrix} c & s \\ -s & c \end{bmatrix},$$

where $$c = \sqrt{\frac{\sigma_k^2 - \delta_2^2}{\delta_1^2 - \delta_2^2}},$$

$$s = \sqrt{1 - c^2},$$

$\delta_1$ is the $k^{th}$ diagonal element in the matrix $R_{re\_k}$, and $\delta_2$ is the $(k+1)^{th}$ diagonal element in the matrix $R_{re\_k}$.

Optionally, when transforming the matrix U, the matrix $\Sigma$, and the matrix $V^H$ to obtain the matrix Q, the matrix R, and the matrix $P^H$, the processing unit 601 is specifically further configured to: use the matrix U as an initial matrix $Q_0$ of the matrix Q and use the matrix V as an initial matrix $P_0$ of the matrix P; and in a process of performing steps 1 to 4 at a $k^{th}$ time: switch a $(k+1)^{th}$ column of elements and a $p^{th}$ column of elements in a matrix $Q_{k-1}$ to obtain a matrix $Q_{re\_k}$, and switch a $(k+1)^{th}$ column of elements and a $p^{th}$ column of elements in a matrix $P_{k-1}$ to obtain a matrix $P_{re\_k}$; obtain a matrix $Q_k$ based on a formula $Q_k = Q_{re\_k} G_2$, and obtain a matrix $P_k$ based on a formula $P_k = P_{re\_k} G_1$; and use, as the matrix Q, a matrix $Q_{t-1}$ obtained after steps 1 to 4 are performed at the $(t-1)^{th}$ time, and use, as the matrix P, a matrix $P_{t-1}$ obtained after steps 1 to 4 are performed at the $(t-1)^{th}$ time.

For explanations of related content, descriptions of beneficial effects, and the like in any precoding apparatus 60 provided above, refer to the foregoing corresponding method embodiment. Details are not described herein again.

In an example, with reference to the communications device shown in FIG. 2, the processing unit 601 may be implemented by using the processor 201 or the processor 207 in FIG. 2. The sending unit 602 may be implemented by using the communications interface 204 in FIG. 2.

Figure 7:
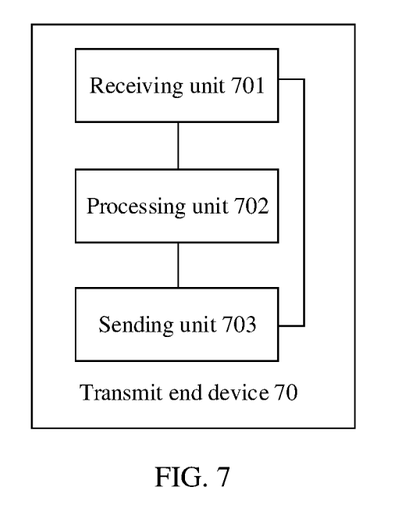
FIG. 7 is a schematic structural diagram of a transmit end device according to an embodiment of this application.

FIG. 7 is a schematic structural diagram of a transmit end device 70 according to an embodiment of this application. In an example, the transmit end device 70 may be configured to perform a step performed by the transmit end device in the method in FIG. 4 or FIG. 5. The transmit end device 70 may include a receiving unit 701, a processing unit 702, and a sending unit 703.

The receiving unit 701 is configured to receive receiving capability information from a receive end device, where the receiving capability information is used to indicate that the receive end device supports a non-linear receiving algorithm. The processing unit 702 is configured to precode to-be-sent data based on the receiving capability information by using any precoding method (the precoding method shown in FIG. 3) provided in the embodiments of this application. The sending unit 703 is configured to send the precoded to-be-sent data. For example, with reference to FIG. 4, the receiving unit 701 may be configured to perform a receiving step corresponding to S201, the processing unit 702 may be configured to perform S202, and the sending unit 703 may be configured to perform S203.

Optionally, the sending unit 703 is further configured to send indication information to the receive end device, where the indication information is used to indicate that the transmit end device precodes the to-be-sent data by using any precoding method (the precoding method shown in FIG. 3) provided in the embodiments of this application. For example, with reference to FIG. 4, the sending unit 703 may be configured to perform S204.

Optionally, the sending unit 703 is further configured to send indication information to the receive end device, where the indication information is used to indicate the receive end device to receive the to-be-sent data by using the non-linear receiving algorithm. For example, with reference to FIG. 5, the sending unit 703 may be configured to perform S302.

Optionally, if the transmit end device is a network device, and the receive end device is a terminal, any one piece of the foregoing indication information is carried in RRC signaling, MAC signaling, or DCI. Alternatively, if the transmit end device is a terminal, and the receive end device is a network device, any one piece of the foregoing indication information is carried in RRC signaling, MAC signaling, or UCI.

Optionally, the non-linear receiving algorithm includes an SIC algorithm or an MLD algorithm.

For explanations of related content, descriptions of beneficial effects, and the like in any transmit end device 70 provided above, refer to the foregoing corresponding method embodiment. Details are not described herein again.

In an example, with reference to the communications device shown in FIG. 2, the processing unit 702 may be implemented by using the processor 201 or the processor 207 in FIG. 2. The receiving unit 701 and the sending unit 703 may be implemented by using the communications interface 204 in FIG. 2.

Figure 8:
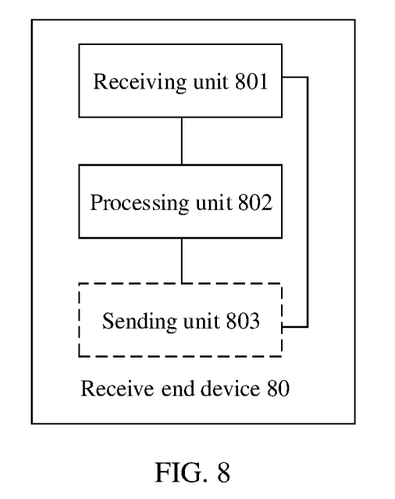
FIG. 8 is a schematic structural diagram of a receive end device according to an embodiment of this application.

FIG. 8 is a schematic structural diagram of a receive end device 80 according to an embodiment of this application. In an example, the receive end device 80 may be configured to perform a step performed by the transmit end device in the method in FIG. 4 or FIG. 5. The receive end device 80 may include a receiving unit 801 and a processing unit 802. Optionally, the receive end device 80 may further include a sending unit 803.

In a first embodiment, the receiving unit 801 is configured to receive indication information sent by a transmit end device, where the indication information is used to indicate that the transmit end device precodes to-be-sent data by using any precoding method (the precoding method shown in FIG. 3) provided in the embodiments of this application. The processing unit 802 is configured to receive the precoded to-be-sent data based on the indication information by using a non-linear receiving algorithm supported by the receive end device. For example, with reference to FIG. 4, the receiving unit 801 may be configured to perform a receiving step corresponding to S204, and the processing unit 802 is configured to perform S205. Optionally, the sending unit 803 is configured to send receiving capability information to the transmit end device, where the receiving capability information is used to indicate that the receive end device supports the non-linear receiving algorithm. For example, with reference to FIG. 4, the sending unit 803 may be configured to perform S201. Optionally, the non-linear receiving algorithm includes an SIC algorithm, an MLD algorithm, or the like.

In a second embodiment, the receiving unit 801 is configured to receive indication information sent by a transmit end device, where the indication information is used to indicate the receive end device to receive data by using a non-linear receiving algorithm. The processing unit 802 is configured to receive data from the transmit end device based on the indication information by using the non-linear receiving algorithm. For example, with reference to FIG. 5, the receiving unit 801 may be configured to perform a receiving step corresponding to S302, and the processing unit 802 may be configured to perform S303. Optionally, the sending unit 803 is configured to send receiving capability information to the transmit end device, where the receiving capability information is used to indicate that the receive end device supports the non-linear receiving algorithm. For example, with reference to FIG. 5, the sending unit 803 may be configured to perform S301. Optionally, the non-linear receiving algorithm includes an SIC algorithm, an MLD algorithm, or the like.

For explanations of related content, descriptions of beneficial effects, and the like in any receive end device 80 provided above, refer to the foregoing corresponding method embodiment. Details are not described herein again.

In an example, with reference to the communications device shown in FIG. 2, the processing unit 802 may be implemented by using the processor 201 or the processor 207 in FIG. 2. The receiving unit 801 and the sending unit 803 may be implemented by using the communications interface 204 in FIG. 2.

An embodiment of this application further provides a communications system. The communications system may include any precoding apparatus 60 provided above and a receive end device that receives data precoded by the precoding apparatus 60.

An embodiment of this application further provides a communications system. The communications system may include any transmit end device 70 provided above and a corresponding receive end device 80 provided above.

An embodiment of this application further provides a communications system. The communications system may include any receive end device 80 in the second embodiment provided above and a transmit end device that communicates with the receive end device 80 to complete configuration of a receiving algorithm used by the receive end device.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer-executable instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, clearly, various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
   decomposing a channel matrix into a product of a matrix Q, a matrix R, and a matrix $P^H$, wherein the matrix $P^H$ is a conjugate transpose matrix of a matrix P, both the matrix Q and the matrix P are unitary matrices, and the matrix R is an upper triangular matrix, and wherein a ratio of at least two diagonal elements of the matrix R is a target ratio, and the target ratio is determined based on a code rate; and
   precoding to-be-sent data based on the matrix P, to generate precoded to-be-sent data.

2. The method according to claim 1, wherein a ratio of diagonal elements of the matrix R is $r_{1,1}$:$r_{2,2}$: . . . : $r_{k,k}$: . . . :$r_{t,t}$=$A_1$:$A_2$: . . . :$A_k$: . . . :$A_t$, $r_{k,k}$ is a $k^{th}$ diagonal element of the matrix R, 1≤k≤t≤K, both k and t are integers, K is a quantity of diagonal elements of the matrix R, $r_{k,k}$=$A_k\theta$, and $\theta$ is determined based on a non-zero singular value obtained through singular value decomposition (SVD) on the channel matrix.

3. The method according to claim 2, wherein $$\theta = \left(\frac{1}{\prod_{j=1}^{t} A_j}\right)^{1/t} \left(\prod_{j=1}^{t} \lambda_j\right)^{1/t},$$

$\lambda_j$ is a $j^{th}$ non-zero singular value obtained through SVD on the channel matrix, j=1, 2, . . . , t, and $\Pi$ represents a product operation.

4. The method according to claim 3, wherein t≥2, and a non-zero singular value obtained through SVD on the channel matrix and a diagonal element in a diagonal matrix obtained through SVD on the channel matrix meet the following condition:

$$\begin{cases} \lambda_1 > \sigma_1 \\ \lambda_2 < \sigma_2 < \frac{\lambda_1 \lambda_2}{\sigma_1} \\ \vdots \\ \lambda_{t-1} < \sigma_{t-1} < \frac{\lambda_1 \lambda_2 \ldots \lambda_{t-1}}{\sigma_1 \sigma_2 \ldots \sigma_{t-1}} \end{cases},$$

wherein
   $\lambda_k$ is a $k^{th}$ non-zero singular value obtained through SVD on the channel matrix, $\sigma_k$ is $A_k\theta$, and i≤k≤t≤K.

5. The method according to claim 1, wherein decomposing the channel matrix into the product of the matrix Q, the matrix R, and the matrix $P^H$ comprises:
   performing singular value decomposition (SVD) on the channel matrix, to decompose the channel matrix into a product of a matrix U, a matrix $\Sigma$, and a matrix $V^H$, wherein the matrix $V^H$ is a conjugate transpose matrix of a matrix V, both the matrix U and the matrix V are unitary matrices, and the matrix $\Sigma$ is a diagonal matrix; and
   transforming the matrix U, the matrix $\Sigma$, and the matrix $V^H$ to obtain the matrix Q, the matrix R, and the matrix $P^H$.

6. The method according to claim 1, further comprising:
   receiving, by a transmit end device, receiving capability information from a receive end device, wherein the receiving capability information indicates that the receive end device supports a non-linear receiving algorithm; and
   sending, by the transmit end device, the precoded to-be-sent data; and
   wherein pre-coding the to-be-sent data based on the matrix P, to generate the precoded to-be-sent data, comprises:
   precoding, by the transmit end device, the to-be-sent data based on the receiving capability information and based on the matrix P.

7. The method according to claim 1, further comprising:
   receiving, by a transmit end device, receiving capability information from a receive end device, wherein the receiving capability information indicates that the receive end device supports a non-linear receiving algorithm;
   sending, by the transmit end device, the precoded to-be-sent data; and
   performing the following:
      sending, by the transmit end device, indication information to the receive end device, wherein the indication information indicates that the transmit end device precodes the to-be-sent data based on the matrix P; or
      sending, by the transmit end device, indication information to the receive end device, wherein the indication information indicates to the receive end device to receive the to-be-sent data using the non-linear receiving algorithm; and
   wherein pre-coding the to-be-sent data based on the matrix P, to generate the precoded to-be-sent data, comprises:
      precoding, by the transmit end device, the to-be-sent data based on the receiving capability information and based on the matrix P.

8. The method according to claim 7, wherein
   the transmit end device is a network device, the receive end device is a terminal, and the indication information is carried in radio resource control (RRC) signaling, media access control (MAC) signaling, or downlink control information (DCI).

9. The method according to claim 7, wherein the non-linear receiving algorithm comprises a successive interference cancellation (SIC) algorithm or a maximum likelihood detection (MLD) algorithm.

10. The method according to claim 7, wherein the transmit end device is a terminal, the receive end device is a network device, and the indication information is carried in radio resource control (RRC) signaling, media access control (MAC) signaling, or uplink control information (UCI).

11. A transmit end device, comprising:
   a non-transitory memory storing instructions; and
   a processor coupled to the memory to execute the instructions to:
      receive receiving capability information from a receive end device, wherein the receiving capability information indicates that the receive end device supports a non-linear receiving algorithm;
      precode to-be-sent data based on the receiving capability information using the method according claim 1; and
      send the precoded to-be-sent data.

12. An apparatus, comprising:
   a processor, configured to decompose a channel matrix into a product of a matrix Q, a matrix R, and a matrix $P^H$, wherein the matrix $P^H$ is a conjugate transpose matrix of a matrix P, both the matrix Q and the matrix P are unitary matrices, and the matrix R is an upper triangular matrix, and wherein a ratio of at least two diagonal elements of the matrix R is a target ratio, and the target ratio is determined based on a code rate; and a precoder, configured to precode to-be-sent data based on the matrix P, to generate precoded to-be-sent data.

13. The apparatus according to claim 12, wherein a ratio of diagonal elements of the matrix R is $r_{1,1}:r_{2,2}: \ldots : r_{k,k}: \ldots :r_{t,t}=A_1:A_2: \ldots :A_k: \ldots :A_t$, $r_{k,k}$ is a $k^{th}$ diagonal element of the matrix R, $1 \leq k \leq t \leq K$, both k and t are integers, K is a quantity of diagonal elements of the matrix R, $r_{k,k}=A_k\theta$, and $\theta$ is determined based on a non-zero singular value obtained through singular value decomposition (SVD) on the channel matrix.

14. The apparatus according to claim 13, wherein $$\theta = \left(\frac{1}{\prod_{j=1}^{t} A_j}\right)^{1/t} \left(\prod_{j=1}^{t} \lambda_j\right)^{1/t},$$

$\lambda_j$ is a $j^{th}$ non-zero singular value obtained through SVD on the channel matrix, j=1, 2, t, and $\Pi$ represents a product operation.

15. The apparatus according to claim 14, wherein t≥2, and a non-zero singular value obtained through SVD on the channel matrix and a diagonal element in a diagonal matrix obtained through SVD on the channel matrix meet the following condition:

$$\begin{cases} \lambda_1 > \sigma_1 \\ \lambda_2 < \sigma_2 < \dfrac{\lambda_1 \lambda_2}{\sigma_1} \\ \vdots \\ \lambda_{t-1} < \sigma_{t-1} < \dfrac{\lambda_1 \lambda_2 \ldots \lambda_{t-1}}{\sigma_1 \sigma_2 \ldots \sigma_{t-1}} \end{cases},$$

wherein $\lambda_k$ is a $k^{th}$ non-zero singular value obtained through SVD on the channel matrix, $\sigma_k$ is $A_k\theta$, and $i \leq k \leq t \leq K$.

16. The apparatus according to claim 11, wherein the processor is configured to:

perform singular value decomposition (SVD) on the channel matrix, to decompose the channel matrix into a product of a matrix U, a matrix $\Sigma$, and a matrix $V^H$, wherein the matrix $V^H$ is a conjugate transpose matrix of a matrix V, both the matrix U and the matrix V are unitary matrices, and the matrix $\Sigma$ is a diagonal matrix; and transform the matrix U, the matrix $\Sigma$, and the matrix $V^H$ to obtain the matrix Q, the matrix R, and the matrix $P^H$.

17. The apparatus according to claim 11, wherein decomposing the channel matrix into the product of the matrix Q, the matrix R, and the matrix $P^H$ comprises:

performing singular value decomposition (SVD) on the channel matrix, to decompose the channel matrix into a product of a matrix U, a matrix $\Sigma$, and a matrix $V^H$, wherein the matrix $V^H$ is a conjugate transpose matrix of a matrix V, both the matrix U and the matrix V are unitary matrices, and the matrix $\Sigma$ is a diagonal matrix; and transforming the matrix U, the matrix $\Sigma$, and the matrix $V^H$ to obtain the matrix Q, the matrix R, and the matrix $P^H$.

18. A transmit end device, comprising:

a non-transitory memory storing instructions; and a processor coupled to the memory to, wherein execution of the instructions by the processor causes the transmit end device to:

receive receiving capability information from a receive end device, wherein the receiving capability information indicates that the receive end device supports a non-linear receiving algorithm;

decompose a channel matrix into a product of a matrix Q, a matrix R, and a matrix $P^H$, wherein the matrix $P^H$ is a conjugate transpose matrix of a matrix P, both the matrix Q and the matrix P are unitary matrices, and the matrix R is an upper triangular matrix, and wherein a ratio of at least two diagonal elements of the matrix R is a target ratio, and the target ratio is determined based on a code rate;

precode to-be-sent data based on the matrix P and based on the receiving capability information, to generate precoded to-be-sent data;

send the precoded to-be-sent data; and perform the following:

send indication information to the receive end device, wherein the indication information indicates that the transmit end device precodes the to-be-sent data based on the matrix P; or send indication information to the receive end device, wherein the indication information indicates to the receive end device to receive the to-be-sent data using the non-linear receiving algorithm.

19. The transmit end device according to claim 18, wherein:

the transmit end device is a network device, the receive end device is a terminal, and the indication information is carried in radio resource control (RRC) signaling, media access control (MAC) signaling, or downlink control information (DCI); or the transmit end device is a terminal, the receive end device is a network device, and the indication information is carried in RRC signaling, MAC signaling, or uplink control information (UCI).

20. The transmit end device according to claim 18, wherein the non-linear receiving algorithm comprises a successive interference cancellation (SIC) algorithm or a maximum likelihood detection (MLD) algorithm.

\* \* \* \* \*

UNITED STATES PATENT AND TRADEMARK OFFICE
CERTIFICATE OF CORRECTION

PATENT NO. : 11,943,017 B2
APPLICATION NO. : 17/357392
DATED : March 26, 2024
INVENTOR(S) : Xia et al.

Page 1 of 1

It is certified that error appears in the above-identified patent and that said Letters Patent is hereby corrected as shown below:

In the Claims

In Column 25, in Claim 14, Line 21, delete "2, t," and insert -- 2, . . ., t, --.

In Column 25, in Claim 16, Line 40, delete "claim 11," and insert -- claim 12, --.

In Column 25, in Claim 17, Line 51, delete "claim 11," and insert -- claim 12, --.

Signed and Sealed this
Fifteenth Day of October, 2024

Katherine Kelly Vidal
*Director of the United States Patent and Trademark Office*